INVENTORS
KARL STEINBUCH
FARHANG ZENDEH
GERHARD MERZ
BY Percy P. Lantzy
ATTORNEY

INVENTORS
KARL STEINBUCH
FARHANG ZENDEH
GERHARD MERZ

BY Percy P. Lantzy
ATTORNEY

INVENTORS
KARL STEINBUCH
FARHANG ZENDEH
GERHARD MERZ

BY Percy P. Lantzy
ATTORNEY

INVENTORS
KARL STEINBUCH
FARHANG ZENDEH
GERHARD MERZ
BY Percy P. Lantzy
ATTORNEY INVENTORS
KARL STEINBUCH
FARHANG ZENDEH
GERHARD MERZ
BY Percy P. Lantzy
ATTORNEY April 5, 1966 K. STEINBUCH ETAL 3,245,034

SELF-CORRECTING CIRCUIT ARRANGEMENT FOR DETERMINING THE SIGNAL WITH A PREFERENTIAL VALUE AT THE OUTPUTS OF A DECODING MATRIX

Filed March 29, 1962 6 Sheets-Sheet 6

INVENTORS
KARL STEINBUCH
FARHANG ZENDEH
GERHARD MERZ

BY Percy P. Lantzy

ATTORNEY

United States Patent Office 3,245,034

Patented Apr. 5, 1966

3,245,034

SELF-CORRECTING CIRCUIT ARRANGEMENT FOR DETERMINING THE SIGNAL WITH A PREFERENTIAL VALUE AT THE OUTPUTS OF A DECODING MATRIX

Karl Steinbuch, Ettlingen, Farhang Zendeh, Kornwestheim, and Gerhard Merz, Rommelshausen, Germany, assignors to International Standard Electric Corporation, New York, N.Y., a corporation of Delaware Filed Mar. 29, 1962, Ser. No. 184,911
Claims priority, application Germany, Apr. 1, 1961, St 17,643
10 Claims. (Cl. 340—146.1)

Figure 1:
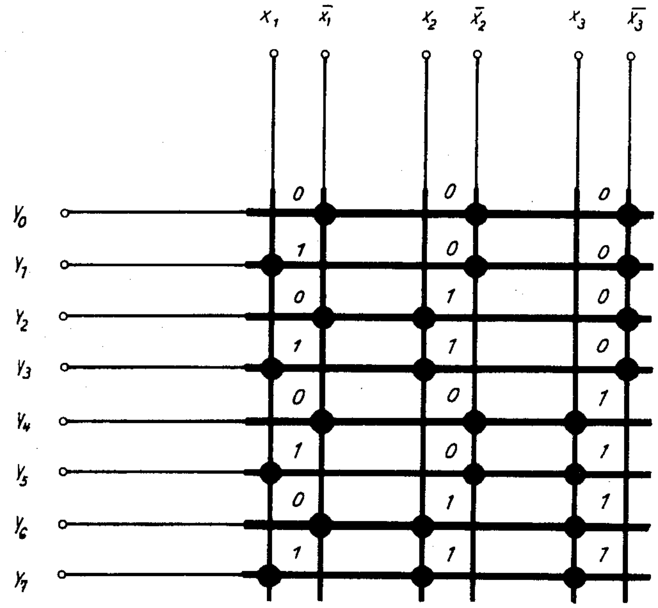

The present invention relates to a circuit arrangement for evaluating a decoding matrix, in other words, for detecting the signal with a preferential value as appearing upon application of the associated binary code group on one of $2^n$ rows of a decoding matrix whose interlacings at the intersecting points are chosen such that to each of the $2^n$ different binary information items of $n$ positions or digits there is assigned one row, whereas signals of a lower value appear on the other $(2^n-1)$ rows.

Since in such a type of matrix either all or a certain number of rows are occupied in the described manner by information items, an output signal will appear at all of the occupied rows, but one row is provided with a preference and, therefore, will also deliver an output signal with e.g. the highest amplitude value. For the purpose of eliminating the unwanted rows, therefore, the output signal with the highest amplitude has to be detected from among the offered output signals.

The evaluation, however, is difficult, or is rendered impossible, whenever errors appear in the decoding matrix itself, in other words, when interlacings in the intersecting points are defective. For example, if magnetic cores are provided at the intersecting points, it may easily happen that one of these cores fails to operate, so that upon application of a binary code group to the respective row in which the core has failed to operate, there will not appear the intended signal, so that consequently it is no longer possible to distinguish between the correct and the unwanted output signals. These conditions will be best understood when comparing the row-output signals of the decoding matrix in dependence upon the agreements between the interlacings per row and the applied binary code group.

It is one object of the present invention to provide a circuit arrangement for supplying the correct result where one or more rows of the decoding matrix should fail to operate. Thus, the circuit arrangement is of the self-correcting type and automatically supplies the correct result. The number of failures of the rows which is capable of being corrected depends in part on the number of positions or digits of the information in the form of binary code groups.

According to the invention the rows of the decoding matrix are connected to a threshold circuit producing a "1"-signal per applied binary code group and per row of the decoding matrix whenever the number of positions of the binary code group which are in agreement with the interlacings of the respective row is either equal or greater than a predetermined value, and producing a "0"-signal in all of the remaining cases. Furthermore, the outputs of the threshold circuit are connected to the columns of a square or check matrix whose intersecting points are interlaced in such a way that one row is assigned to one of the $2^n$ output combinations of the threshold circuit. Finally, the row outputs of the check matrix are connected to a second threshold circuit for the determination of the extreme values and delivers an output signal for only that particular row for which an extreme value has been determined.

The first threshold circuit is capable of being adjusted in such a way that in the case of a given number of $n$ positions of the input information there will result a maximum number of disturbed rows of the decoding matrix which are capable of being corrected with the aid of the second threshold circuit, that is, this threshold circuit will produce the correct result although the maximum number of rows of the decoding matrix has failed to operate.

Figure 2:
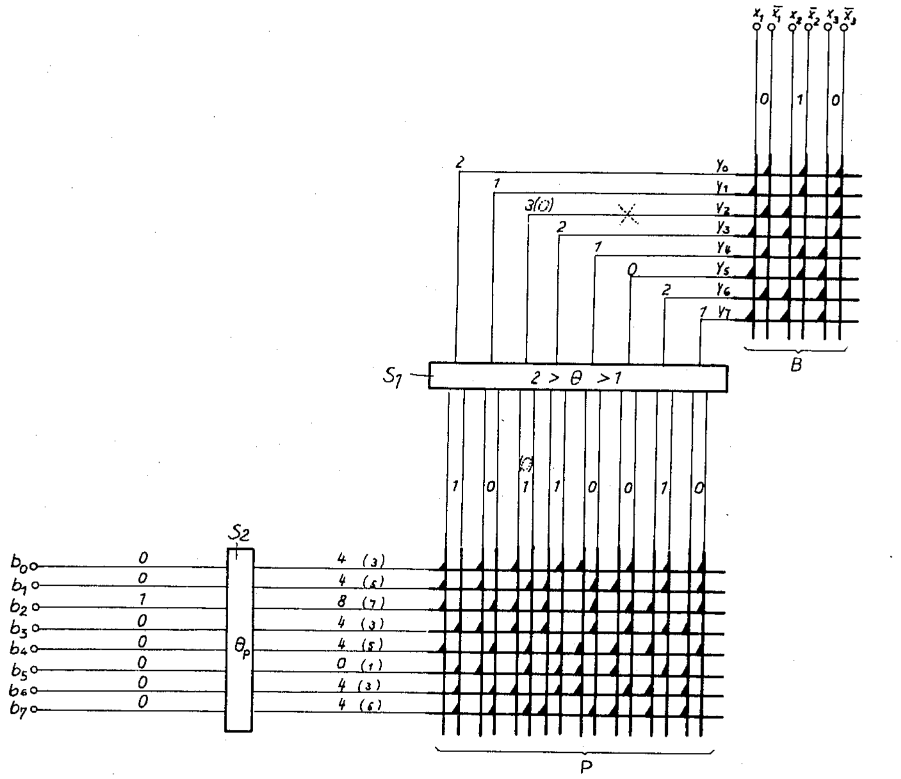
Figure 3:
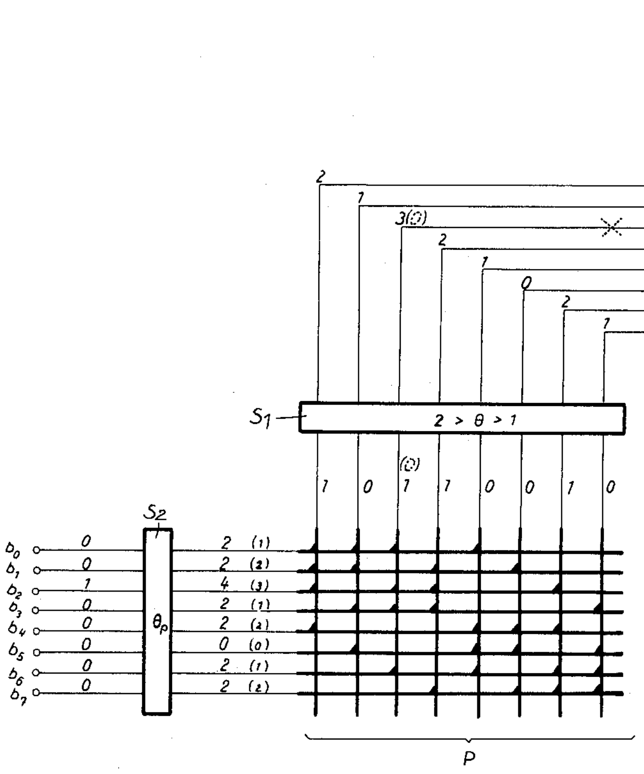
Figure 4:
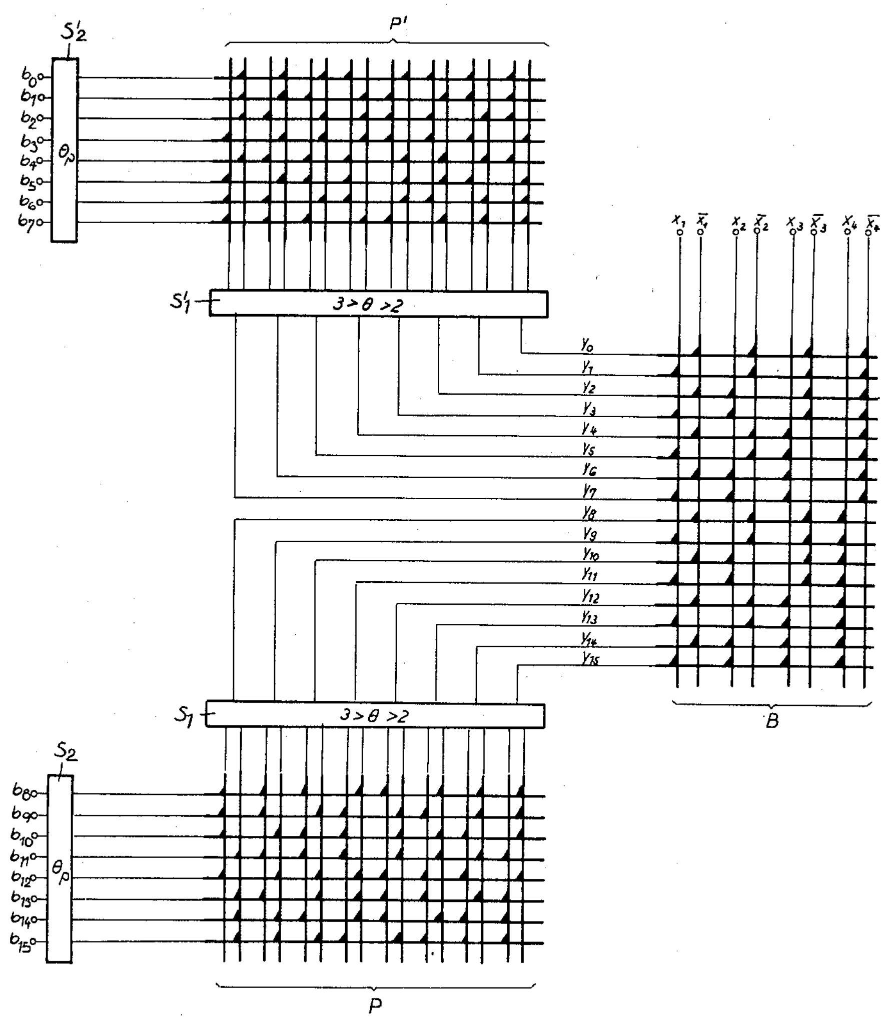
Figure 5:
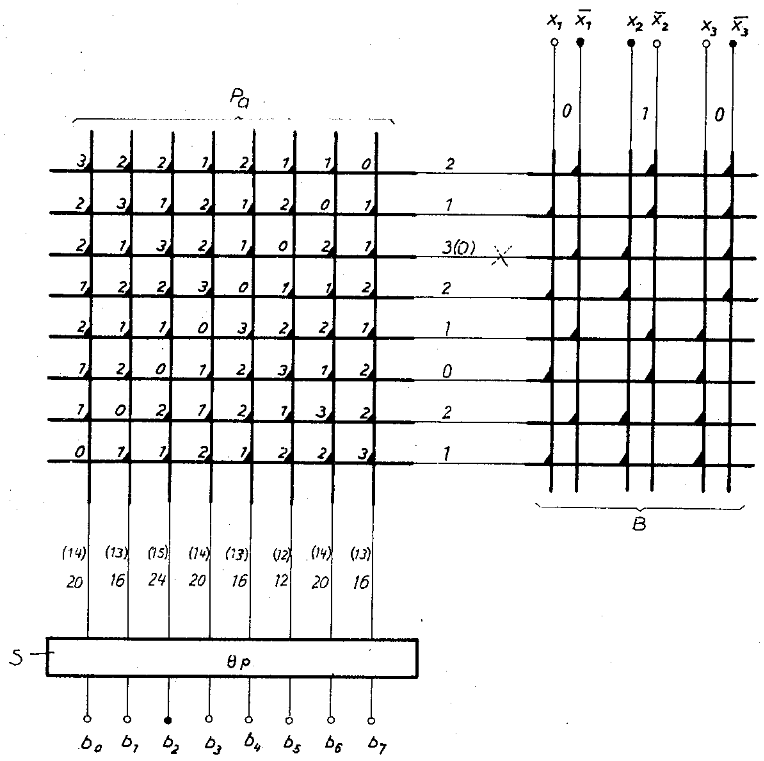
Figure 6:
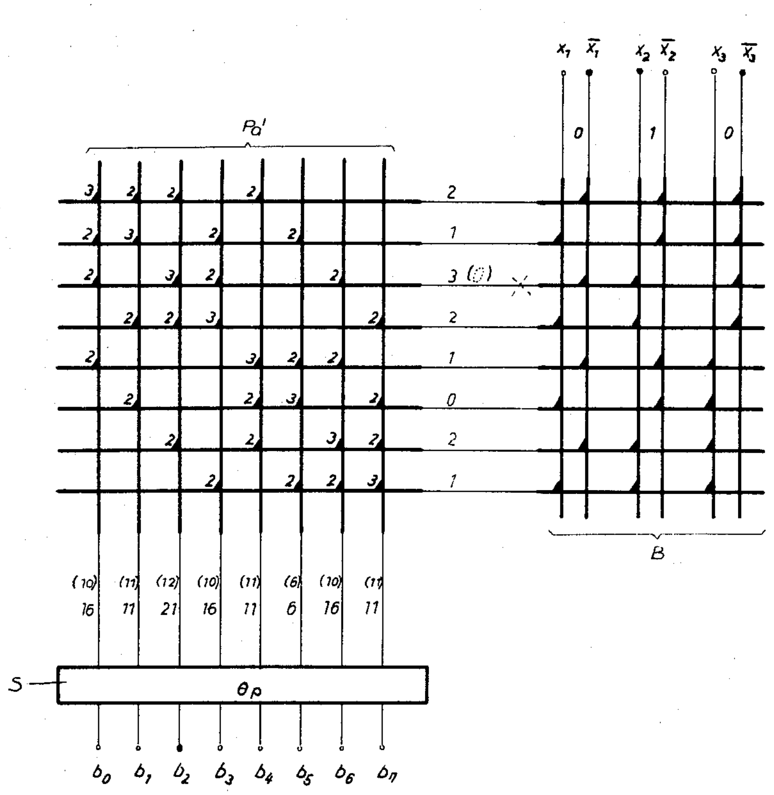

The above-mentioned and other features and objects of this invention will become more apparent by reference to the following description taken in conjunction with the accompanying drawings, in which:

FIG. 1 shows an example of a decoding matrix with which the circuit of this arrangement will operate, FIG. 2 shows a circuit arrangement according to the invention, FIG. 3 shows a circuit arrangement according to the invention with single inputs of the check matrix, FIG. 4 shows a circuit arrangement with a split check matrix, FIG. 5 shows a modified circuit arrangement according to the invention, and FIG. 6 shows a circuit arrangement according to FIG. 5 with a simplified type of check matrix.

FIG. 1 shows a decoding matrix with three inputs for the binary code groups and, accordingly eight rows for the decoded output. The fact that the inputs of the columns are designed contradictory may at first remain unconsidered herein. To each row, in accordance with the property of the decoding matrix, there is assigned one of the eight information items which are capable of being represented with the aid of a three-digit binary code. Upon applying any one of these eight information items to the column leads, signals will appear on all eight row leads, and the amplitude of these signals will depend on the number of interlacings being in agreement with one another. For example, when assuming that the information 010 is applied, the agreements will result which are indicated in FIG. 1 at the outputs of the rows. The row $y_2$ which is assigned to the information 010 is seen to have the greatest number of agreements, namely, three, all of the remaining rows have less agreements, i.e. either 0 or 1 or 2. If now the row $y_2$ is disturbed in such a way that it will fail completely, which means in this case there exist 0 agreements, then an evaluation of the applied information can no longer be carried out unambiguously, because the actual row does not respond, and because there exist three rows all having the highest number of agreements.

Referring to FIG. 2 it is assumed that all interlacings of a row are disturbed. Like in the case of FIG. 1, it is again assumed that the information 010 is applied, and that the third row has failed. Accordingly, in this row instead of three agreements, there will erroneously appear 0 agreements, which is indicated by the 0 in parantheses. The outputs of the rows of the decoding matrix B are connected to the threshold circuit $S_1$. Accordingly, this circuit $S_1$ comprises $2^n$ inputs and just as many outputs. The function of the threshold circuit $S_1$ can be represented by the inequality $$n-j \geqq \theta \geqq n-j-1$$

wherein $j$ is at first freely selectable between 0, 1, . . . $n-1$. Each output of the threshold circuit $S_1$, whose input has an excitation value greater than or equal to the value $(n-j)$, is marked "1," whereas those of the output leads whose associated inputs are smaller than or equal to $(n-j-1)$, are marked "0." Accordingly, at the outputs of the threshold circuit there will only be obtained in the two values "0" or "1."

The outputs of the threshold circuit $S_1$ are now connected to the columns of the check matrix P. Just like in the case of the decoding matrix B, the inputs of the columns of the check matrix are likewise contradictory. This design is not absolutely necessary in the case of a completely occupied matrix, but offers the well-known advantages in cases where the matrix is only partly occupied. The rows of the check matrix P, similar to the rows of the decoding matrix B, are assigned to an output combination of the threshold circuit $S_1$, and are correspondingly interlaced at the points of intersection. In this way it is again possible to identify the signals appearing at the rows, by the number of agreements between the interlacings in this row and the applied information. With respect to the chosen example the represented combination will result at the output of the threshold circuit, and the stated agreements at the rows of the check matrix. First of all it will be recognized that the number of agreements of the row which is supposed to respond in accordance with the binary code group, has been substantially enlarged with respect to the other rows. With the aid of the threshold circuit $S_2$ this row can be determined by detecting the extreme value with the aid of conventional means.

If the third row of the decoding matrix B which is supposed to deliver the identification signal, is disturbed, then a "0" will appear at the corresponding output of the threshold circuit $S_1$ instead of a "1," and accordingly, also the agreements in the rows of the check matrix P are changed by one unit. As may be taken from the numerals in parentheses, the third row now only contains seven agreements, but the distance from the remaining rows is so great that an unambiguous determination of the extreme value is still possible.

The range of tolerance for the threshold circuit $S_2$ is dependent upon the threshold value of the threshold circuit $S_1$, and upon the number $n$ of the binary digits of the binary code groups. This range of tolerance also serves as a direct measurement for the number of errors of the decoding matrix, which can be corrected with the aid of the check matrix. Accordingly, it is possible with each number of $n$ digits for the threshold value $\theta$ to find an optimum, at which the greatest possible number of disturbed rows can be corrected. Table 1 shows that with an increasing $n$ the threshold $\theta$ can be chosen so that the range of tolerance $\Delta\theta$ will reach a maximum value.

*Table 1*

| $n$ | $1>\theta>0$ | $2>\theta>1$ | $3>\theta>2$ | $4>\theta>3$ | $5>\theta>4$ | $6>\theta>5$ | $7>\theta>6$ | $8>\theta>7$ | $9>\theta>8$ | $10>\theta>9$ | ... |
|---|---|---|---|---|---|---|---|---|---|---|---|
| 1 | 2 | | | | | | | | | | |
| 2 | 2 | 2 | | | | | | | | | |
| 3 | 2 | 4 | 2 | | | | | | | | |
| 4 | 2 | 6 | 6 | 2 | | | | | | | |
| 5 | 2 | 8 | 12 | 8 | 2 | | | | | | |
| 6 | 2 | 10 | 20 | 20 | 10 | 2 | | | | | |
| 7 | 2 | 12 | 30 | 40 | 30 | 12 | 2 | | | | |
| 8 | 2 | 14 | 42 | 70 | 70 | 42 | 14 | 2 | | | |
| 9 | 2 | 16 | 56 | 112 | 140 | 112 | 56 | 16 | 2 | | |
| 10 | 2 | 18 | 12 | 168 | 252 | 252 | 168 | 12 | 18 | 2 | |
| . | . | . | . | . | . | . | . | . | . | . | |
| . | . | . | . | . | . | . | . | . | . | . | |

Table 1 can be extended by adding each time two adjacent numbers, and by placing the result as a further number of the able below the right-hand summand.

The range of tolerance $\Delta\theta p$ corresponds to one Hamming distance. With the aid of one Hamming distance of $\Delta\theta p$ it is known to correct $$Z=\frac{\Delta\theta_p}{2}-1$$

errors. Accordingly, it is possible to derive from the Table 1 the Table 2 from which it can be seen which threshold value $\theta$ has to be chosen for a given value $n$ in order to be able to correct a maximum number of failing rows in the decoding matrix:

*Table 2*

| $n$ | $1>\theta>0$ | $2>\theta>1$ | $3>\theta>2$ | $4>\theta>3$ | $5>\theta>4$ | $6>\theta>5$ | $7>\theta>6$ | $8>\theta>7$ | $9>\theta>8$ | $10>\theta>9$ | ... |
|---|---|---|---|---|---|---|---|---|---|---|---|
| 1 | 0 | | | | | | | | | | |
| 2 | 0 | 0 | | | | | | | | | |
| 3 | 0 | 1 | 0 | | | | | | | | |
| 4 | 0 | 2 | 2 | 0 | | | | | | | |
| 5 | 0 | 3 | 5 | 3 | 0 | | | | | | |
| 6 | 0 | 4 | 9 | 9 | 4 | 0 | | | | | |
| 7 | 0 | 5 | 14 | 19 | 14 | 5 | 0 | | | | |
| 8 | 0 | 6 | 20 | 34 | 34 | 20 | 6 | 0 | | | |
| 9 | 0 | 7 | 27 | 55 | 69 | 55 | 27 | 7 | 0 | | |
| 10 | 0 | 8 | 35 | 83 | 125 | 125 | 83 | 35 | 8 | 0 | |
| . | . | . | . | . | . | . | . | . | . | . | |
| . | . | . | . | . | . | . | . | . | . | . | |

It is also easily possible to extend this table by adding respectively two adjacent numbers. This result plus 1 results in a number of the table, namely that particular one which is found below the ring-hand summand.

FIG. 3 shows an example in which the inputs of the check matrix P are not designed in a contradictory manner. Also in this case the correct row can be easily determined by determination of the extreme value as may be recognized from the numerals shown at the rows.

As the number of $n$ digits increases, there also increases the expenditure for the check matrix P and, consequently, the possibility of disturbances likely to appear in the check matrix itself. In accordance with the described example and in the case of $n$ inputs of the decoding matrix, the check matrix comprises $2^n \times 2^n$ points of intersection. With respect to $n=10$ inputs there will result about $10^6$ points of intersection and, consequently, circuit elements for the check matrix. This investment in circuitry can now be greatly reduced by dividing the outputs of the decoding matrix into $2^{n-k}$ groups of $2^k$ leads, and then assigning to each such group a check matrix of the size $2^k \times 2^k$. In this way it will be possible to reduce the expenditure by the factor $2^{n-k}$. In this case $k$ may assume values ranging between 3 and $(n-1)$; however, an optimum reduction of the expenditure will be obtainable in the case of $k=3$. In this case, one error can be corrected per group or bundle, which when considering all groups results in correcting $2^{n-3}$ errors. Accordingly, this arrangement will only offer advantages if $n$ becomes greater than 9. Fig. 4 shows a circuit arrangement for a decoding matrix comprising four inputs. In accordance with what has been mentioned hereinbefore, there are provided two bundles (groups) with eight lines or leads each. The two check matrices P and P' are provided with $8 \times 8=64$ points of intersection. The threshold values of the two threshold circuits $S_1$ and $S_1'$ may easily be taken from Table 1.

With respect to the capability of correcting the errors it is appropriate to subdivide the check matrix P into $2^{n-5}$ single square-type check matrices of the size $2^5 \times 2^5$. In this way the expenditure can be reduced by the factor $2^{n-5}$, and it is thus possible to correct altogether $5 \times 2^{n-5}$ errors.

The subdivision of the check matrix P may thus be carried out in accordance with different view-points, and will always depend on the existing problem, namely of whether it is first of all desirable to reduce the expenditure, or whether it is desirable to correct as many errors as possible.

The described circuit arrangement can still be modified in a way that the threshold circuit $S_1$ will not be necessary anymore. As may be seen in FIG. 5, the row outputs of the decoding matrix B are directly connected to the rows of the check matrix P*a*. The admittances at the points of intersection of the check matrix are now differently high, i.e., respectively one column of an output combination is assigned to the decoding matrix, and the admittance is in proportion to the agreement with the input information appearing in this combination at the respective row of the signification matrix. In the example shown in FIG. 5, the information 010 is again applied to the decoding matrix, so that the combination of agreements will be obtained as stated at the outputs of the rows. To this combination there is assigned the third column from the left of the check matrix P*a*. The numerals inserted at the remaining columns represent the output combinations of the remaining seven input information items.

In accordance with this selection of admittances at the points of intersection there is obtained in the case of a certain input information at each point of intersection a contribution towards the output on the columns, which is in proportion to the agreements. In order to point this out more clearly the admittances in the present example are multiplied with the value of the agreements of the output combination, so that there will result the quantities of the column currents as indicated at the column outputs. It will be seen that the third column from the left, which is assigned to the shown output combination of the decoding matrix, has the highest share and, therefore, can be easily ascertained with the aid of the threshold circuit S by way of the extreme value determination.

In the case of a failure of the third row of the decoding matrix which is assigned to the input information 010, there will also appear a change in the contributions of the points of intersection to the individual column currents of the checking matrix P*a*. The quantities of the column currents resulting in this case are indicated in parentheses likewise at the column outputs. Also in the case of the failure of an entire row, the third column, now as before, will be seen to have the highest share, so that the correct result will also be indicated in this disturbed case.

The check matrix P*a* can still be simplified by interlacing only those of the points of intersection whose associated output information of the decoding matrix is above a predetermined value of agreements. FIG. 6 shows a circuit arrangement comprising a check matrix P'*a* in which only those of the points of intersection are interlaced, with respect to which there appear two, or more than two, agreements. From the numerals shown at the outputs of the columns it will be seen that it is also possible in this case to obtain an unambiguous determination of the input information in the case of both a disturbed and an undisturbed decoding matrix.

Also in the case of the examples shown in FIGS. 5 and 6 the check matrix can be subdivided into smaller units, as described hereinbefore.

Threshold circuits S, $S_1$, $S_1'$, $S_2$ and $S_2'$ are known in some circles as voltage comparators where the input signal or voltage is compared to a fixed reference voltage and are maintained inoperative until the reference voltage is equalled or exceeded. These threshold circuits include a plurality of circuits each being coupled to a different one of the inputs and may take the form of any one of the circuits discussed in J. Millman and H. Taub, "Pulse and Digital Circuits," chapter 15, pages 458 through 484. Each of these plurality of circuits compose the threshold circuits of the various embodiments of this invention and are operative to provide an output pulse when the input signal exceeds the amplitude of a reference voltage and no output when the input signal is below the amplitude of the reference voltage.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A self-correction arrangement for a decoding matrix comprising:

$2^n$ binary code groups having *n* positions including
- *n* input means for said code groups
- and
- $2^n$ output rows coupled to give a pattern to said input means to produce on each row a preferential signal represented by a different one of said code groups; and a circuit to detect said output row corresponding to said code groups coupled to said input means even when that row is defective including:
- a check matrix arrangement having
  - a plurality of input means each coupled to a different one of said output rows of said decoding matrix, and
  - a plurality of output means coupled to said input means of said check matrix arrangement in accordance to a given pattern to provide the highest amplitude signal on said output means of said check matrix arrangement associated with said output row of said decoding matrix corresponding to said code groups, and
  - threshold devices having a predetermined threshold level coupled to the output means of said check matrix arrangement to pass only said highest amplitude signal.

2. An arrangement according to claim 1, wherein said check matrix arrangement includes at least one square-type matrix.

3. An arrangement according to claim 1, wherein said output row of said decoding matrix are directly connected to said input means of said check matrix arrangement.

4. An arrangement according to claim 1, further including additional threshold devices having a given threshold level coupling said output rows of said decoding matrix to said input means of said check matrix arrangement.

5. An arrangement according to claim 4, wherein said check matrix arrangement includes two square-type matrices; and said additional threshold devices include
- a first group of additional threshold devices coupling one half of said output rows of said decoding matrix to the input means of one of said square-type matrices, and
- a second group of additional threshold devices coupling the other half of said output rows of said decoding matrix to the input means of the the other of said square-type matrices.

6. An arrangement according to claim 1, wherein said check matrix arrangement includes two square-type matrices, and further including
- a first group of threshold devices coupling one half of said output rows of said decoding matrix to the input means of one of said square-type matrices, and
- a second group of threshold devices coupling the other half of said output rows of said decoding matrix to the input means of the other of said square-type matrices.

7. An arrangement according to claim 1, wherein said check matrix arrangement is divided into $2^{n-k}$ check matrices of the size $2^k \times 2^k$, each of said check matrices having its input means coupled to a plurality of $2^k$ output rows of said decoding matrix, where $k$ is equal to $3 \ldots n-1$.

8. An arrangement according to claim 7, further including $2^k$ additional threshold devices to connect the input means of each of said check matrices to said $2^k$ output rows of said decoding matrix.

9. An arrangement according to claim 1, wherein said check matrix arrangement is divided into $2^{n-3}$ check matrices of the size $2^3 \times 2^3$, each of said check matrices having its input means coupled to a plurality of $2^3$ output rows of said decoding matrix.

10. An arrangement according to claim 9, further including $2^3$ additional threshold devices to connect the input means of each of said check matrices to said $2^3$ output rows of said decoding matrix.

References Cited by the Examiner

UNITED STATES PATENTS

| | | | |
|---|---|---|---|
| 3,047,843 | 7/1962 | Katz et al. | 340—146.1 X |
| 3,063,636 | 11/1962 | Sierra | 340—146.1 X |
| 3,100,888 | 8/1963 | Oleksiak | 340—146.1 X |
| 3,157,860 | 11/1964 | Batley | 340—146.1 X |

ROBERT C. BAILEY, *Primary Examiner.*

MALCOLM A. MORRISON, *Examiner.*